United States Patent [19]

Inoue et al.

[11] Patent Number: 4,783,762

[45] Date of Patent: Nov. 8, 1988

[54] PROGRAMMABLE CONTROLLER

[75] Inventors: Tadashi Inoue, Hirakata; Noboru Asami, Nagaokakyo; Mitsuru Nakamura, Uji, all of Japan

[73] Assignee: Omron Tateisi Electronics Co., Kyoto, Japan

[21] Appl. No.: 45,195

[22] Filed: Apr. 30, 1987

Related U.S. Application Data

[63] Continuation of Ser. No. 571,749, Jan. 18, 1984, abandoned.

[30] Foreign Application Priority Data

Jan. 19, 1983 [JP] Japan .................. 58-8075

[51] Int. Cl.⁴ .................. G06F 11/30; G06F 15/46
[52] U.S. Cl. .................. 364/900; 371/19; 364/144
[58] Field of Search ... 364/200 MS File, 900 MS File, 364/14 X; 371/19, 22

[56] References Cited

U.S. PATENT DOCUMENTS

| | | | |
|---|---|---|---|
| 4,176,394 | 11/1979 | Kaminski et al. | 364/200 |
| 4,315,313 | 2/1982 | Armstrong et al. | 371/19 |
| 4,423,508 | 12/1983 | Shiozaki et al. | 371/19 |
| 4,425,643 | 1/1984 | Chapman et al. | 371/20 |
| 4,429,368 | 1/1984 | Kurii | 371/19 X |
| 4,517,671 | 5/1985 | Lewis | 371/19 |

FOREIGN PATENT DOCUMENTS

| | | |
|---|---|---|
| 56-35252 | 4/1981 | Japan .................. 371/19 |
| 81/01891 | 7/1981 | PCT Int'l Appl. |
| 1441444 | 6/1976 | United Kingdom . |
| 1457604 | 12/1976 | United Kingdom . |
| 1480520 | 7/1977 | United Kingdom . |
| 1513946 | 6/1978 | United Kingdom . |

OTHER PUBLICATIONS

IBM Technical Disclosure Bulletin, vol. 25, No. 2, Jul. 1982; "Debug Program Multiple Full Screen Displays", by Fichtner et al.

Primary Examiner—Raulfe B. Zache
Assistant Examiner—Thomas C. Lee
Attorney, Agent, or Firm—Stevens, Davis, Miller & Mosher

[57] ABSTRACT

A programmable controller which executes instructions stored in a user program memory to thereby effect predetermined system control. The programmable controller includes a mode designation section for designating a trace trigger mode, an origin instruction input section for inputting an instruction which forms an origin of the trace trigger, an origin instruction memory section for storing the origin instruction inputted from the origin instruction input section, an instruction extraction section for receiving the designation of the trace trigger mode to extract the instruction in coincidence with the origin instruction stored in the origin instruction memory section out of a group of instructions subjected to execution and processing by the instruction execution section, a trace information extraction section for extracting trace information whose reference is the instruction extracted by the instruction extraction section out of a group of instructions subjected to execution and processing by the instruction execution section, a trace information memory section for storing the trace information, and a display section for displaying the trace information stored in the trace information memory section.

7 Claims, 5 Drawing Sheets

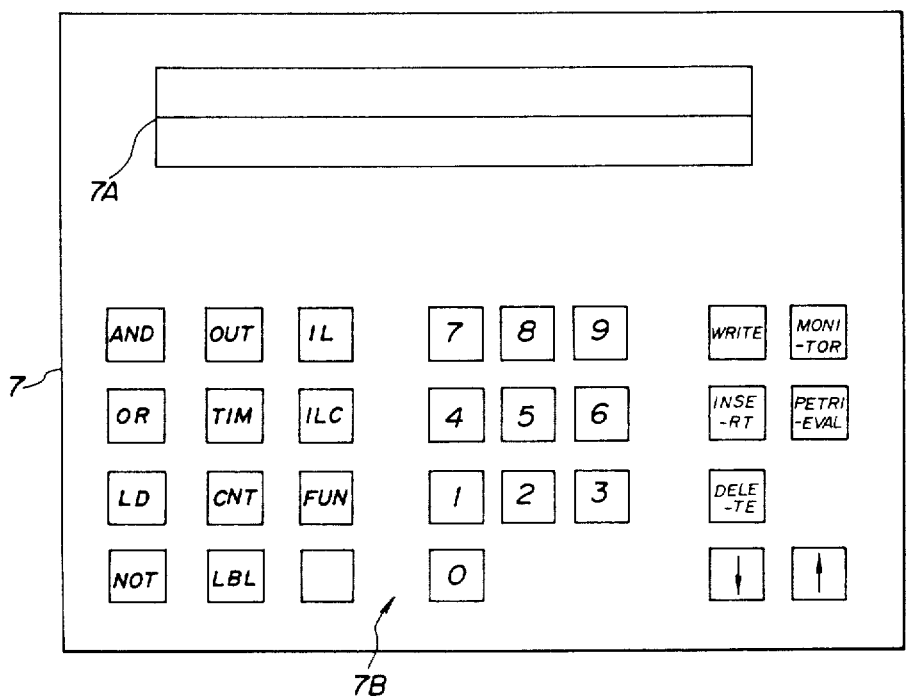

PROGRAMMABLE CONTROLLER

This application is a continuation of application Ser. No. 571,749 filed Jan. 18, 1984, now abandoned.

BACKGROUND OF THE INVENTION

This invention relates to a programmable controller, and particularly to a programmable controller which can monitor a suitable instruction execution stage.

As is known, programmable controller, can be provided with a trace function which monitors the instruction execution stage in order to debug the user program or determine the operating state of a controlled system.

However, the trace function provided on the conventional programmable controller is designed so that when specific address information is received, the execution content of an instruction corresponding to said address can be monitored. That is, the conventional trace function is such that controlling is effective in relatively simple cases, so that if one instruction is read, the execution of this instruction is determined to be a particular part of a control flow. For example, this is the case where the instruction execution is successively carried out from the leading address of the user program memory.

For this reason, where control becomes complicated and instructions which vary the control flow (such as jump instructions) are included in the program, the conventional trace function fails to determine if the read instruction is present in a particular route of the control flow.

SUMMARY OF THE INVENTION

It is an object of the present invention to provide a programmable controller which can easily determine the execution state of a user program as a flow of an actually processed and executed stage.

According to this invention, for example, an instruction at the junction or the branch in flow of the user program is inputted as the instruction forming the origin, and instructions executed before and after said origin instruction and/or addresses thereof are stored in memory means. This data can be successively displayed on display means. Thereby, the user can know the execution state, that is, a flow of the program and can easily determine the movement of the system. Accordingly, it is possible to obtain a programmable controller which is much more convenient than those in the prior art.

BRIEF DESCRIPTION OF THE DRAWINGS

FIG. 3 is a view showing assignment of stored data of data areas R0, R1, ... R9 in a RAM of the programmable controller.

FIG. 4 is a view showing an operation surface of a program console of the programmable controller.

FIG. 7 is a view showing specific examples of instructions and addresses thereof stored in data areas R0, R1, ... R8 by the trace trigger operation in the programmable controller.

DETAILED DESCRIPTION OF THE INVENTION

Figure 1:
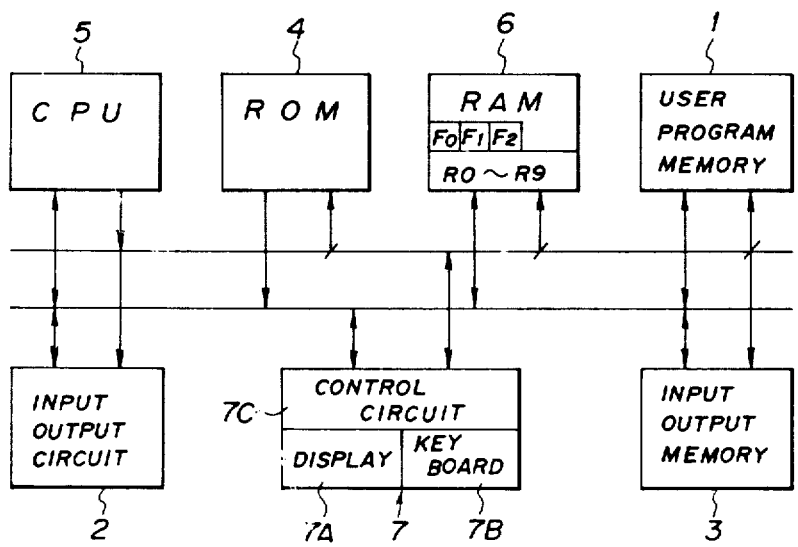
FIG. 1 is a block diagram showing a programmable controller in accordance with one embodiment of the present invention.

FIG. 1 is an electric structural view showing a programmable controller in accordance with one embodiment of the present invention.

This programmable controller basically comprises a user program memory 1 for storing a user program, an input/output circuit 2 for transferring signals from or to input/output devices in a controlled system, a memory 3 for storing external input/output data and internal input/output data, a ROM 4 for storing a system program, a central processing unit (CPU) 5 for effecting the control operation on the basis of the system program stored in ROM 4, and a program console (hereinafter referred to as "procon") 7 operated by the user.

CPU 5 executes user instructions stored in the user program memory 1. The basic operations of CPU 5 are well known, and therefore, detailed description thereof will be omitted and only a brief description thereof will be given in the following. That is, this includes (1) that processing operations are carried out on the basis of data in the input/output memory 3 and output data in the input/output memory 3 are rewritten from the results of the processing operations, (2) that input data in the input/output circuit 2 are written into a predetermined area of the input/output memory 3, and (3) that output data of the predetermined area in the input/output memory 3 are set to an output port of the input/output circuit 2. In this invention, the CPU 5 performs the trace trigger processing operation and monitor processing operation in addition to the basic operations as described above.

The trace trigger processing operation as used herein means that the origin instruction inputted from the procon 7 is made to be a reference to temporarily store the execution instructions and addresses thereof before and after thereof. The monitor processing operation as used herein means that the temporarily stored instructions and addresses thereof are displayed on the procon 7. These two operations are called the trace trigger function.

Figure 2:
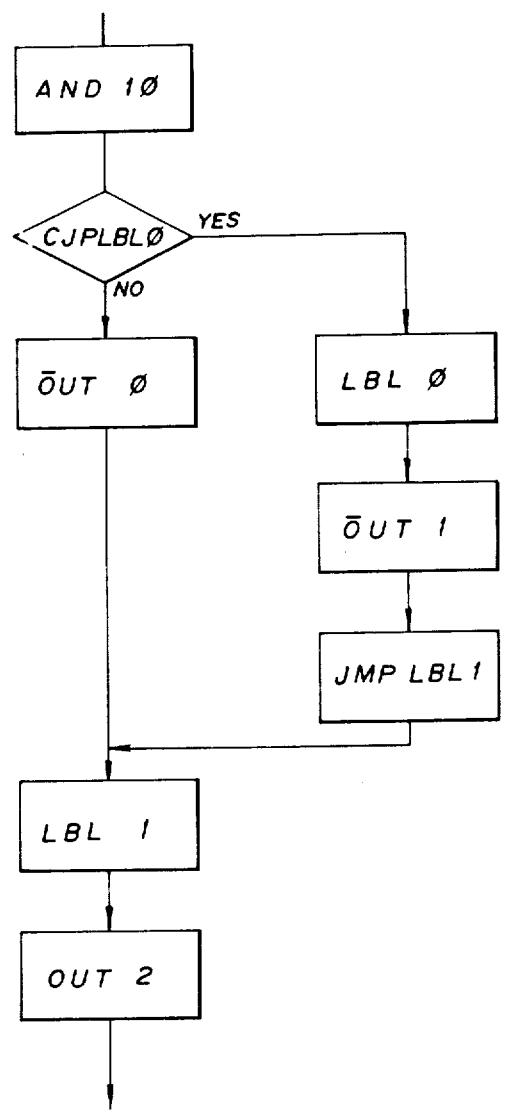
FIG. 2 is a fragmentary flow chart showing one example of a user program applied to the programmable controller in accordance with one embodiment of the present invention.

FIG. 2 is a flow chart with a part of the user program extracted for explanation of the trace trigger function. This flow chart shows the case where the label instruction is executed. Each user instruction herein shown is stored in the user program memory 1 while corresponding to addresses as follows:

| Address | User Instruction |
|---------|------------------|
| 1000    | AND 10           |
| 1001    | CJP LBL 0        |
| 1002    | OUT 0            |
| 1003    | LBL 1            |
| 1004    | OUT 2            |
| .       | .                |
| .       | .                |
| 3000    | LBL 0            |
| 3001    | OUT 1            |
| 3002    | JMP LBL 1        |
| .       | .                |
| .       | .                |

RAM 6 is used as a working memory as CPU 5 performs the above-described operations. Particularly in the present invention, three flags F0, F1, F2 and ten data areas (R0-R9) are provided in order to perform the trace trigger function. Flag F0 is the flag showing that the trace trigger function is assigned, F1 is the flag showing that the trace trigger is turned on (trigger-on), and F2 is the flag showing that the trace trigger operation is terminated. As shown in FIG. 3, data areas R0-R8 are areas for storing execution instructions of steps −1, 0, +1 ... +7 and addresses theeof with the origin instruction placed as a center. Here, (−) indicates the step before the origin instruction, and (+) indicates the step after the origin instruction. R9 is an area for storing the address of the origin instruction (in this embodiment, the label instruction).

In the procon 7, a display 7A for displaying characters and a keyboard 7B are provided on the operating surface externally of the case, and a control circuit 7C is provided in the interior of the case. FIG. 4 shows the specific example of the operating surface.

Figure 5:
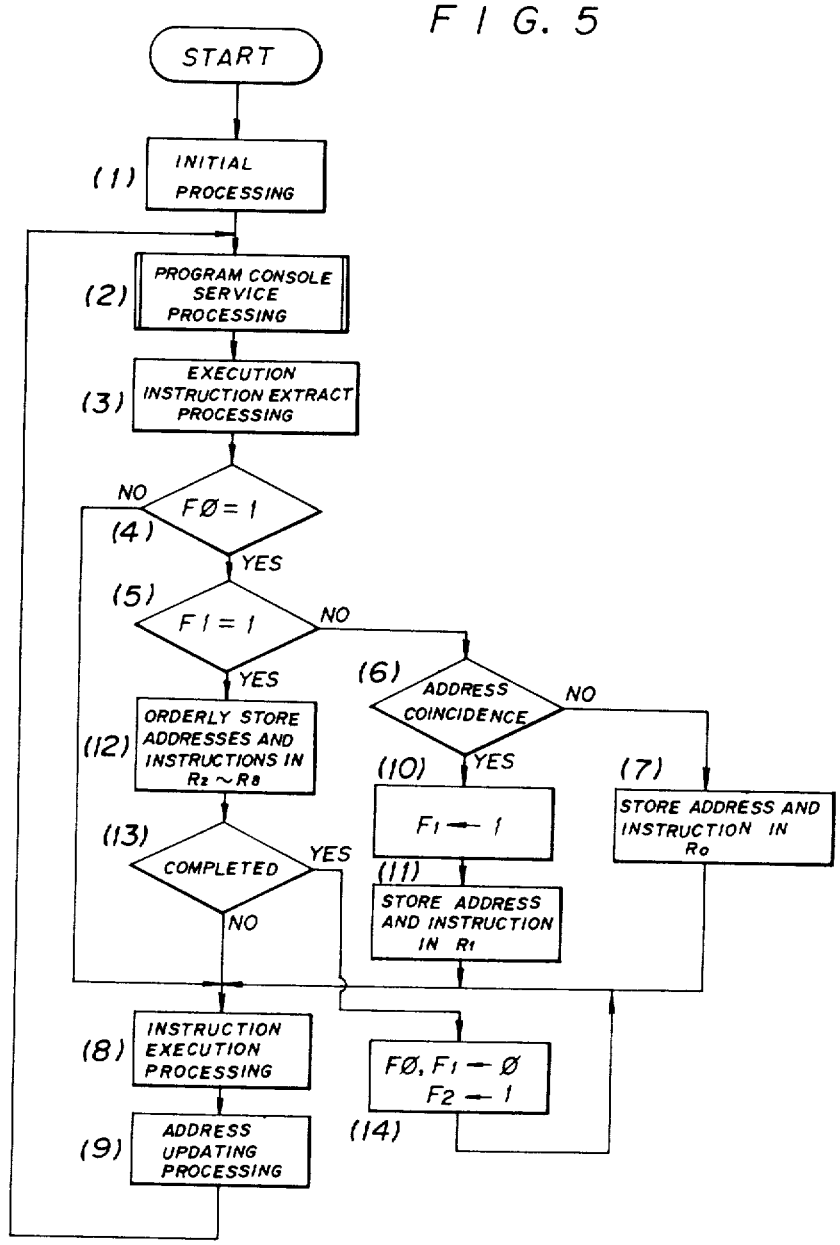
FIG. 5 is a flow chart showing an essential part of the present invention among the control operations of the programmable controller.

In the following, among the control operations performed by the CPU 5, the trace trigger processing operation and monitor processing operation in accordance with the present invention will be described with reference to FIGS. 5 and 6.

When the operation is initiated, the well known initial processing (Step 1) is first performed. In this case, the flags F0, F1 and F2 and data areas R0-R9 are initialized.

Though not shown, the aforementioned basic operations are successively performed. At the time of or after termination of the basic operations, the trace trigger processing operation and monitor processing operation in accordance with the present invention will be performed.

Figure 6:
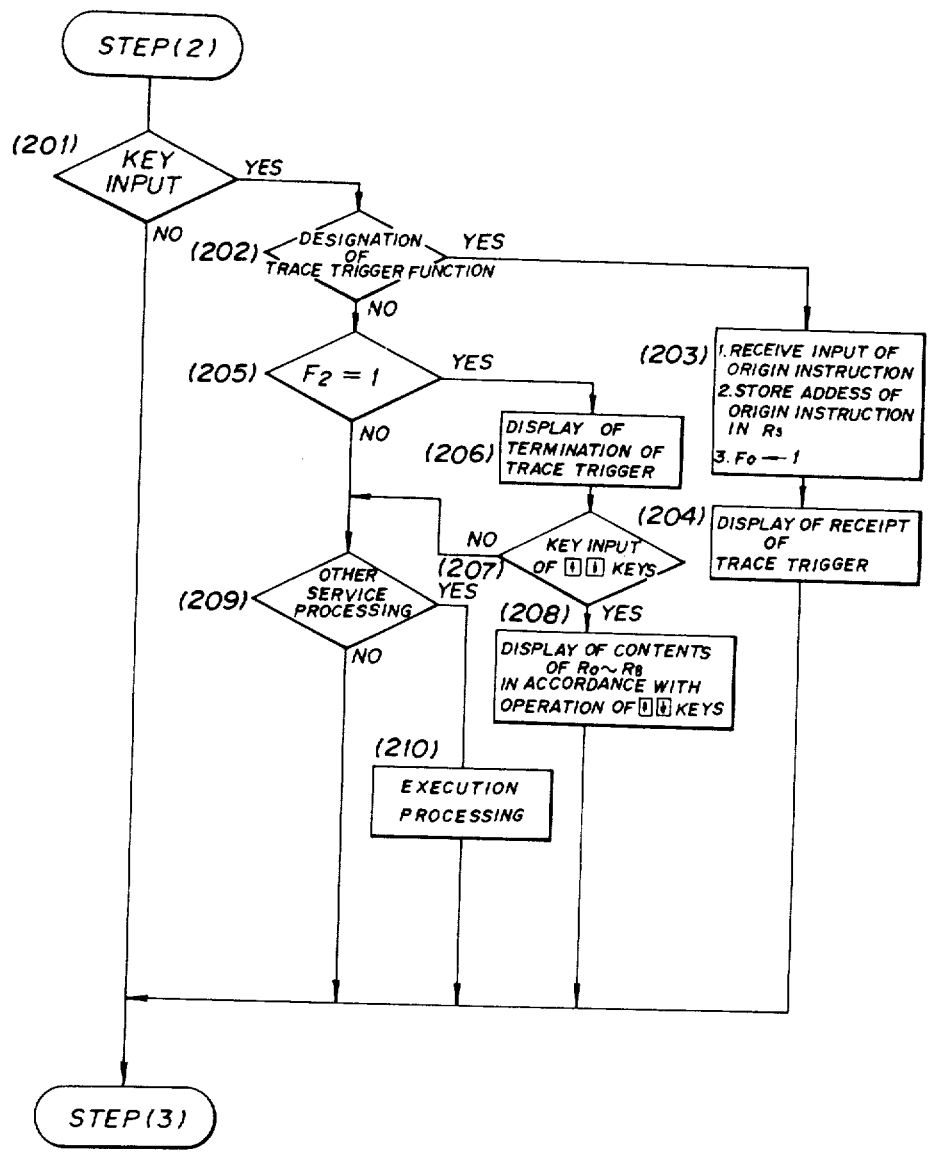
FIG. 6 is a flow chart showing a service processing routine by a program console.

First, in the procon service processing routine (Step 2), when the key operation of the keyboard 7B is detected in step 201, as shown in FIG. 6, the step proceeds to step 202 to judge whether or not the key operation is the designation of the trace trigger function. In this embodiment, the designation of the trace trigger function (setting of the trace trigger mode) is performed by operation of the monitor key. Of course, alternatively, an exclusive-use key for setting the trace trigger mode can be provided.

If the trace trigger mode is present, step 203 accepts the LBL key operation. An address of the input designation label is retrieved and stored in the data area R9, then flag F0 is set. In this embodiment, the instruction LBL1 of the user program shown in FIG. 2 is the designation label, and the address 1003 thereof is stored in the data area R9. Then, the acceptance of the trace trigger is displayed on the display 7A in step 204, and the step proceeds to step 3.

In step 3, the instructions of the user program executed as shown in FIG. 2 are extracted from the program memory 1. Since the relation of F0=1 is established (step 4), the step proceeds to step 5 to judge whether or not F1 is set. In this cse, F1 is not set, and therefore, the step proceeds to step 6. In step 6, coincidence or non-coincidence between the instructions address now being executed and the address of the label instruction LBL 1 stored in the data area R0 is judged. Since non-coincidence is present, the step proceeds to step 7, the address of instructions now being executed and the instruction word are stored in the data area R0. Then said instruction is executed in step 8, and after execution of the instruction, the address is updated (step 9), and the step is returned to step 2. The above-described operation is repeated until the detection of coincidence is attained in step 6. That is, when instruction JMP LBL1 before one step of the label instruction LBL1 and address 3002 are stored in the data area R0, the coincidence between the instruction address now being executed and the designation address is detected in step 6. As a consequence, the step proceeds to step 10.

In step 10, the flag F1 is set. Then, the label instruction LBL1 and address 1003 are stored in the data area R1 in step 11, the step proceeds to steps 8→9→2→3→4→5.

In step 5, the flag F1 is set this time, the step proceeds to step 12. In step 13, instruction OUT2 next to the label instruction LBL1 and address thereof are stored in the next data area R2. Until the storage of the instructions and addresses into the final data area R8 has been detected, routines of steps 13→8→9→2→3→4→5 12 are repeatedly executed.

In this manner, the instruction and address of −1 step, that is, before one step from the designation label, are stored in the data area R0, and the instructions and addresses for a portion of +7 step from the designation instruction are stored in the data areas R2 to R8.

Then, the step proceeds to step 14 from step 13, the flag F0, F1 is reset and the flag F2 is set. The set is returned to step 2 through steps 8, 9.

In the procon service processing routine, the setting of the flag F2 at step 205 through steps 201, 202 is detected, and the step proceeds to step 206. In step 206, the termination of the trace trigger is displayed on the display 7A. Then, one awaits the operation of the shift key ↑ ↓ on the keyboard 7B (step 207). When the shift key ↑ or ↓ is operated, the contents of the data areas R0 to R8 are displayed in response to the operation of the shift key. That is, the content of the data area R0 is displayed on the display 7A in response to the operation of the up-shift key ↑ . Next, whenever the down-shift key ↓ is operated, the contents from the data area R1 to R8 are displayed in order. Accordingly, this display immediately tells you the execution state of the program at the junction of the control flow what route the content has taken.

In this key operation of the keyboard 7B, where operation of a key other than those keys mentioned above is effected, the content thereof is judged in step 209. That is, where the demand of the other procon service is present, it is executed in step 210 and otherwise the step proceeds to step 3.

While in the above-described embodiment, the address of execution instruction and the instruction word for the portion of 1 step (−1) before the designation label instruction, that is, origin instruction and for the portion of 7 step (+7) after the origin instruction, respectively, it will be noted that the number of steps is not limited to the first-mentioned number of steps but the number of steps before and after the origin instruction can be suitably selected. What number is employed can be suitably selected in consideration of the fact of what is the origin instruction.

Furthermore, although in the above-described embodiment, the label instruction is used as the designation instruction, that is, the origin instruction, it will be of course noted that the instruction is not limited to the label instruction but other instruction words can be designated.

While in the above-described embodiment, both the addresses and instruction words are displayed to display the traced-triggered instruction, it will be noted that only one of them can be displayed.

In addition, although in the above-described emebodiment, a display for displaying characters has been used as a display, it will be noted in the present invention that the display is not limited thereto. That is, of course, a CRT display can be used so as to display the origin instruction and instructions before and after the origin instruction in the form of a flow chart.

We claim:

1. A programmable controller having a trace mode, said controller comprising:
   (a) origin instruction input means for generating an origin instruction to trigger a trace function,
   (b) a memory means connected to said origin instruction input means, for receiving and storing said origin instruction,
   (c) a display means connected to said memory means,
   (d) a user program memory for storing user program instructions,
   (e) instruction execution means connected to said user program memory, for receiving and executing said user program instructions,
   (f) mode designation means, responsive to generation of said origin instruction, for designating a trace trigger mode,
   (g) instruction and trace information extraction means, responsive to a designation of said trace trigger mode, for extracting an instruction which coincides with said origin instruction from a group of instructions being subjected to execution and processing by said instruction execution means and for extracting trace information, which has a reference corresponding to said instruction extracted which coincides with said origin instruction, from a group of instructions being subjected to execution and processing by said instruction execution means, by (i) setting a first flag in the memory means responsive to a designation of said trace trigger mode, to indicate that a trace trigger function has been designated; (ii) extracting an instruction currently being executed from the user program memory; (iii) responsive to said setting of the first flag, determining whether the instruction currently being executed coincides with the origin instruction; (iv) if no coincidence is determined in (iii), (a) storing the instruction currently being executed in a predetermined area of the memory means, (b) completing execution of this instruction, and (c) repeating (i), (ii) and (iii); (v) if a coincidence exists between the instruciton currenty being executed and the origin instruction, (a) setting a second flag in the memory means to prevent (iii) from being performed again until the trace trigger function has been terminated, (b) storing the instruction currently being executed in a predetermined area of the memory means, and (c) completing execution of this instruction, and (vi) sequentially extracting successive instructions for current execution from the user program memory and sforing said successive instructions in predetermined areas of the memory means.

2. The programmable controller according to claim 1 wherein said trace information comprises processing instructions both before and after the instruction extracted by said instruction extraction means with said extracted instruction being used as said reference.

3. The programmable controller according to claim 1 wherein said trace information comprises addresses of the processing instructions both before and after the instruction extracted by said instruction extraction means with said extracted instruction being used as said reference.

4. The programmable controller according to claim 1 wherein said trace information comprises the processsing instructions and their associated addresses both before and after the instruction extracted by said instruction extraction means with said extracted instruction being used as said reference.

5. The programmable controller according to claim 1 wherein said display means comprises a character display.

6. The programmable controller according to claim 1 wherein said display means comprises a CRT display, and said trace information comprising the processing instructions are displayed in the form of a flow chart on said CRT display.

7. The programmable controller according to claim 1, wherein said trace information extraction means stores said predetermined instructions in said predetermined areas of said memory means in accordance with a given execution sequence of said group of instructions.

* * * * *